United States Patent [19]

Watanabe et al.

[11] Patent Number: 5,178,804
[45] Date of Patent: Jan. 12, 1993

[54] METHOD OF MANUFACTURING ACOUSTIC DIAPHRAGM

[75] Inventors: Kazuhiro Watanabe, Kawasaki; Mutsuaki Murakami, Tokyo, both of Japan

[73] Assignee: Matsushita Electric Industrial Co., Ltd., Osaka, Japan

[21] Appl. No.: 735,721

[22] Filed: Jul. 25, 1991

[30] Foreign Application Priority Data

Jul. 27, 1990 [JP] Japan .................. 2-199406
Jul. 27, 1990 [JP] Japan .................. 2-199407

[51] Int. Cl.$^5$ ............................. C01B 31/04
[52] U.S. Cl. ...................... 264/29.7; 264/291; 264/292; 264/331.12; 264/331.19; 423/448
[58] Field of Search ............ 264/29.1, 29.6, 29.7, 264/291, 292, 331.12, 331.19; 423/445, 448, 449

[56] References Cited

U.S. PATENT DOCUMENTS

| | | | |
|---|---|---|---|
| 4,876,077 | 10/1989 | Murakami | 423/448 |
| 4,954,193 | 9/1990 | Murakami et al. | 264/29.6 X |
| 4,983,244 | 1/1991 | Murakami et al. | 264/29.6 X |
| 5,043,185 | 8/1991 | Murakami et al. | 427/113 |

FOREIGN PATENT DOCUMENTS 55-32318 8/1980 Japan .
3-85899 4/1991 Japan .

*Primary Examiner*—Leo B. Tentoni
*Attorney, Agent, or Firm*—Lowe, Price, LeBlanc & Becker

[57] ABSTRACT

A method of manufacturing a dome- or cone-like acoustic diaphragm by a process including the step of heating a polymeric film comprising an aromatic polyimide, a polyoxadiazole or an aromatic polyamide, to a temperature range of 2,000° C. or above, and the step of pressure molding. The heating and the pressure molding may be carried out at the same time when the polymeric film is heated for its graphitization. Alternatively, the pressure molding may be carried out while the polymeric film having been graphitized by the heating is further heated. Still alternatively, a polymeric film having been pressure-molded in the course of heat polycondensation of a polyamic acid may be graphitized by heating.

12 Claims, No Drawings

METHOD OF MANUFACTURING ACOUSTIC DIAPHRAGM

BACKGROUND OF THE INVENTION

1. Field of the Invention

This invention relates to a method of manufacturing an acoustic diaphragm used in sound instruments such as speakers and microphones.

2. Description of the Prior Art

In recent years, there is a progress in the achievement of digital sound instruments that makes much severer the performance required in diaphragms for speakers or the like. For example, it is required for the diaphragms to be less deformed by an external force to cause less sound distortion, and be capable of reproducing sounds over a wide pitch and giving a clear-sound quality. For this purpose, they are required to be light-weight, and yet to have an excellent elasticity or stiffness. These requirements can be summarized as follows, as specific conditions for their physical properties.

(1) They have a large Young's modulus (E).
(2) They have a small density ($\rho$).
(3) They have a large sound velocity (propagation velocity V of sound waves).
(4) They undergo an appropriate internal loss (tan$\delta$) of the vibration.
(5) They have a large strength.
(6) They can be molded in any desired form.

Between V, E and $\rho$ in the foregoing, there is the relationship of:

$$V = (E/\rho)^{\frac{1}{2}}$$

In addition to these conditions, it is needless to say that they are required to be manufactured with ease and be stable to external conditions such as heat and humidity.

As material for the diaphragms, paper, plastic, aluminum, titanium, beryllium, boron, silica, etc. have been hitherto used. These have been used alone, or in combination with glass fiber, carbon fiber or the like in the form of a composite. They have been also used in the form of a metal alloy. Paper and plastic, however, are not satisfactory in the characteristics such as Young's modulus, density and sound velocity. In particular, they have extremely poor frequency characteristics in a high frequency band, and it has been difficult to obtain a clear-sound quality when they are used as diaphragms for tweeters or squawkers. Aluminum, magnesium, titanium, etc. can each attain a reasonably good sound velocity, but have so small an internal loss of vibration that they may cause a phenomenon of high-frequency resonance. Thus, these materials have been able to achieve only unsatisfactory characteristics for high-frequency diaphragms. As for boron, beryllium, etc., they have better physical properties than the materials discussed above, and hence can attain a good sound quality required for the diaphragms. The boron, beryllium, etc., however, are disadvantageous in that they are very expensive and also have poor workability.

Diaphragms comprised of a carbon material are being developed with the aim of diaphragms that have overcome the disadvantages involved in the conventional diaphragms, have superior high-frequency wave characteristics and also can reproduce a tone with a good quality. This makes the most of the excellent physical properties inherent in carbon (graphite) so that it can be used as a diaphragm. Such a material for diaphragms can be obtained by the methods as exemplified below.

(1) A method in which a graphite powder and a polymeric resin are combined in a composite form.

(2) A method in which a graphite powder and a polymeric resin are combined in a composite form, followed by sintering into a graphite-carbon composite.

(3) A polymeric compound is carbonized by heat treatment.

Of these methods, a typical diaphragm obtained by the method (1) is a diaphragm of a composite type comprising a matrix vinyl chloride resin and a graphite powder. This is known to be a diaphragm having superior properties. The method (2) may more specifically include a method in which a graphite powder is mixed in a liquid crystal component of a crude oil decomposed pitch and then the mixture is heated to effect carbonization, and a method in which a binder that bounds graphite powder is added to a graphite powder, which is then heated to effect carbonization. In the latter case, a method is known in which, in the carbonization of the binder, a monomer or prepolymer of a thermosetting resin is heated together with a thermoplastic resin having functional groups capable of decomposing upon heating and mutually reacting to crosslinkingly cure. These methods have been developed with the aim of preventing shrinkage or deformation from occurring when the heat treatment is carried out, and can give diaphragms with superior characteristics.

However, the diaphragms obtained by the method (1) have so poor humidity and temperature characteristics that their vibration characteristics may become seriously deteriorated at temperatures of 30° C. or above.

The method (2) requires a complicated process for the manufacture, and has been very disadvantageous when diaphragms are mass-produced in an industrial scale. That is, for example, from the viewpoint of the manufacturing process, what is questioned is that very complicated steps such as high-temperature treatment and solvent fractionation or extraction must be provided so that the crude oil decomposed pitch used as a starting material and the liquid crystal component thereof are obtained in an industrial scale. From the viewpoint of the mass production, what is questioned is that a high-level technique is required such that the graphite powder and the binder resin are thoroughly kneaded using a kneader with a high shear force so that the graphite crystals cleaved by mechanochemical reaction and the binder resin are dispersed in a mutually strongly combined state and the crystal planes of the graphite are oriented in the direction of the surface of a sheet. In addition, although the diaphragms obtained by these methods have very superior characteristics that have not been hitherto attained, they have slightly poorer characteristics than the characteristics obtainable by beryllium, considered to be of a highest level at present, and have an elasticity that is no match for the theoretical elasticity 1,020 GPa of graphite monocrystals.

In the method (3), so good characteristics as expected at first were not obtainable since all conventional plastics films are hardly graphitizable materials. Moreover, this method have been disadvantageous in that plastic materials used have so low a carbon yield and undergo so large a dimensional shrinkage that the products are often deformed or cracked. That is, it has been difficult to obtain diaphragms that can be molded into any desired form, can endure thorough quality control and also have excellent characteristics.

In order to eliminate the disadvantages of the method (3), the present inventors have proposed that a film comprising a specific polymeric compound is heated in an inert gas to form a graphite film, and the resulting graphite film is used as a diaphragm (Japanese Laid-open Patent Application No. 3-085899). This is based on a recent discovery that some of condensation polymers can be graphitized by a high-temperature heat treatment, which are called graphitizable materials.

The graphite film obtained by this method, however, has had the problems that it has a small thickness and also may still undergo so large a dimensional shrinkage at the time of heating as to cause deformation or cracks, and hence it has been impossible to mold the graphite film (or sheet) into any desired form. As a result, this method has been disadvantageous in that only a flat diaphragm can be produced and also the diaphragm can not have a strength high enough to be used as an acoustic diaphragm.

SUMMARY OF THE INVENTION

Under such circumstances, an object of the present invention is to provide a diaphragm made of graphite, that can overcome the disadvantages involved in the graphite diaphragm previously proposed by the present inventors, can be worked into any desired from by a very simple means, and also have characteristics that are superior to those of any conventional diaphragms.

To achieve the above object, the present invention provides a method of manufacturing an acoustic diaphragm by a process comprising the step of heating a polymeric film to a temperature range of 2,000° C. or above, and the step of pressure molding.

The polymeric film may be comprised of at least one of an aromatic polyimide, a polyoxadiazole and an aromatic polyamide.

In a preferred embodiment of the method of the present invention, the heating and the pressure molding are carried out at the same time when a polymeric film comprising an aromatic polyimide or the like is graphitized. That is, the acoustic diaphragm is manufactured by a process comprising the step of heating a polymeric film to effect its graphitization and at the same time pressure-molding the polymeric film, at a temperature of 2,000° C. or above (hereinafter "first embodiment").

In another preferred embodiment of the present invention, the pressure molding is carried out while a polymeric film having been graphitized by the heating is further heated. That is, the acoustic diaphragm is manufactured by a process comprising the steps of heating a polymeric film at a temperature of 2,000° C. or above to effect its graphitization, and then pressure-molding the graphitized polymeric film at a temperature of 2,000° C. or above (hereinafter "second embodiment").

In another embodiment of the present invention, a polymeric film having been pressure-molded in the course of heat polycondensation of a polyamic acid is graphitized by heating at a temperature of 2,000° C. or above. That is, the acoustic diaphragm is manufactured by a process comprising the steps of pressure-molding a polymeric film in the course of heat polycondensation of a polyamic acid, and then heating the molded polymeric film at a temperature of 2,000° C. or above to effect its graphitization (hereinafter "third embodiment").

In the pressure molding, the polymeric film may be formed into a dome (which may have a spherical curved surface or an oval curved surface) or a cone.

The pressure molding may preferably be carried out while a tension is applied to the polymeric film.

Other objects and preferred embodiments of the present invention will become apparent from the following description.

DESCRIPTION OF THE PREFERRED EMBODIMENTS

In the present invention, a polymeric film is heated to effect its graphitization before, after or at the same time with its pressure molding. The polymeric film may be comprised of an aromatic polyimide, a polyoxadiazole or an aromatic polyamide.

The aromatic polyimide, polyoxadiazole and aromatic polyamide used in the present invention can be exemplified by the following compounds.

Aromatic polyimide

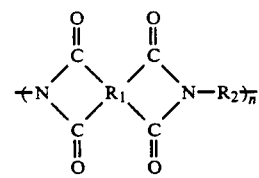

wherein $R_1$ represents

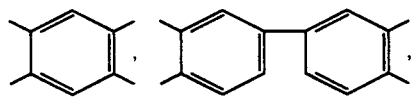

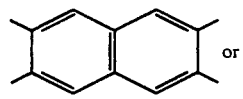

or

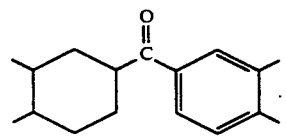

$R_2$ represents

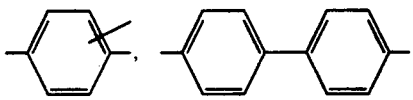

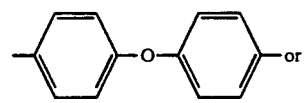

or

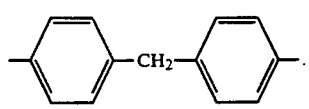

Aromatic polyamide

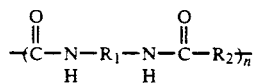

wherein $R_1$ and $R_2$ each represent

Polyoxadiazole

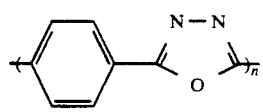

Of the above polymeric compounds, it is most preferred to use the aromatic polyimide.

The aromatic polyimide can be obtained, for example, in the following way.

First, a pyromellitic anhydride represented by the following formula (a) and a diaminophenyl ether represented by the following formula (b) are used.

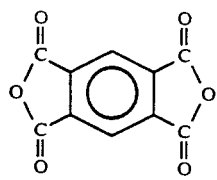

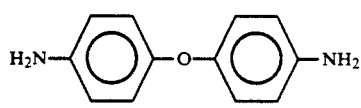

Both the compounds are reacted to synthesize a soluble polyamic acid represented by the following formula (c).

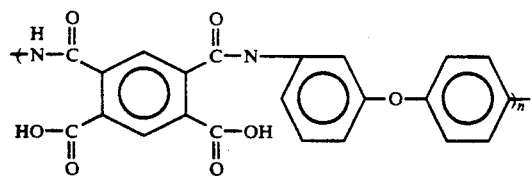

Next, using a polyamic acid solution obtained by dissolving the polyamic acid in a suitable solvent, a polyamic acid film is prepared by casting. For example, the polyamic acid solution is casted onto a substrate, followed by drying (heating) to remove part of the solvent to give a polyamic cast film. In this instance, the solvent used may include a mixed solvent of N-methylpyrrolidone, dimethyl acetamide and an aromatic hydrocarbon. Subsequently, though variable depending on the type of the polyamic acid, the polyamic acid film is dehydrated by heating at a temperature usually ranging from 70° C. to 400° C., preferably from 120° C. to 300° C., to effect imidization so that it is converted to a film of a polyimide represented by the following formula (d).

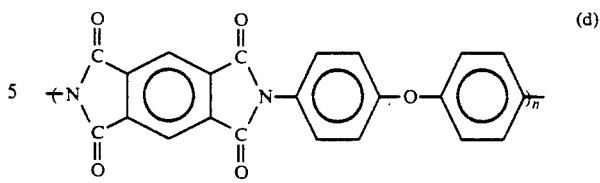

In the present invention, the above polymeric film is graphitized by heating. This heating is carried out in a temperature range of 2,000° C. or above, preferably at a temperature of 2,000° C. to 3,000° C., and more preferably at a temperature of 2,200° C. to 3,000° C. Heating at a temperature below 2,000 may make it difficult to graphitize the polymeric film.

The heating for graphitization may preferably be carried out in an inert gas atmosphere, e.g., an argon gas atmosphere.

In the first and second embodiments of the present invention, the pressure molding is carried out in a temperature range of 2,000° C. or above, preferably at a temperature of 2,000° C. to 3,000° C., and more preferably at a temperature of 2,200° C. to 3,000° C. Pressure molding carried out below 2,000° C. may bring about a break of the film since the film is still substantially in a state of hard carbon at that temperature. In a temperature range of 2,000° C. or above, the polymeric film becomes elastic as it undergoes graphitization and hence the pressure molding becomes feasible. In other words, substantially no pressure should be applied in the temperature range below 2,000° C. Here, what is meant by the state of substantially no application of pressure is that a pressure is applied to the polymeric film by a molding jig only under its own weight.

The pressure molding is carried out using a conventional molding jig made of carbon or graphite, that can give the desired from such as a dome or a cone.

The pressure applied for the purpose of the above pressure molding depends on the film thickness, and it must be made higher with an increase in its thickness. Stated specifically, it is usually necessary to apply, as a pressure per sheet of the film, a pressure of 0.2 kg/cm² or more, and preferably 0.5 kg/cm² to 200 kg/cm², when the film is in a thickness of 25 μm or less, and about 1.0 kg/cm² or more and preferably 5 kg/cm² to 200 kg/cm², when the film is in a thickness of 25 μm or more. A pressure less than these may cause a dome-like or cone-like molded film to wrinkle.

In the first embodiment of the present invention, the above heating and pressure molding of the polymeric film are carried out at the same time in the same temperature range described above.

In the second embodiment of the present invention, the heating to graphitize the polymeric film is first carried out in the temperature range described above, and then the pressure molding is carried also in the above temperature range while the graphitized polymeric film is further heated at the temperature range described above.

In the third embodiment of the present invention, what is pressure-molded is not a polymeric film having been completely converted to an imide film, but a film obtained by, as previously described, casting on a substrate the solution containing a polyamic acid followed by evaporation to remove part of the solvent. The resulting cast film is then pressure-molded at a temperature of 70° C. to 400° C. This pressure molding may be carried out at a pressure of 0.5 kg/cm² to 2,000 cm².

The polymeric cast film is pressure-molded, using a mold made of stainless steel or the like, at a state where the imidization has a little progressed, i.e., in the course of imidization (or heat polycondensation of the polyamic acid), and the polymeric film is further heated also after the pressure molding to complete the imidization.

The polyimide film thus molded tends to wrinkle on its surface because of its dimensional shrinkage or be deformed, if heated for graphitization as it is, and hence may preferably be heated for graphitization using a shape-retaining mold made of graphite or carbon, at the stage of which a pressure is also applied.

The polyimide film is heated for graphitization in an inert gas atmospher, e.g., an argon gas atmosphere. The heating in the inert gas atmosphere should be carried out at a temperature reaching 2,000° C. or above, and preferably 2,500° C. or above (usually up to 3,000° C.), at which the polymeric film can be well graphitized. After the temperature has reached 2,000° C. or above, a pressure of usually about 0.1 to 200 kg/cm² is applied. Application of a pressure more than 200 kg/cm² is unnecessary in general. This additional application of pressure is not only useful for preventing the difficulties such that the resulting acoustic diaphragm wrinkles, but also useful for preventing any faults from being produced in graphite crystals.

In the method of the present invention, a tension (e.g., about 2,000 kg/cm²) may preferably be applied to the polymeric film when it is pressure-molded. The tension can be applied by a method in which the film being heated is stretched in the lateral direction, or a method in which the polymeric film is secured to a frame so that a tension is naturally applied as the film shrinks as a result of the heating.

The pressure molding carried out under application of the tension to the polymeric film can be effective for promoting the graphitization to make it possible to obtain a graphite acoustic diaphragm with superior sound characteristics.

The acoustic diaphragm obtained can be used in speakers, microphones, etc.

As described above, in the first and second embodiment of the method of manufacturing an acoustic diaphragm according to the present invention, the pressure molding is carried out in the temperature range of 2,000° C. or above which is used for the heat treatment for graphitizing the polymeric film, at the stage of which the film becomes elastic. Hence, it is possible to obtain an acoustic diaphragm in a suitable form such as a dome or a cone. Since the polymeric film is comprised of the readily graphitizable material such as the aromatic polyimide, polyoxadiazole or aromatic polyamide, it is possible to obtain a diaphragm made of an excellent graphite.

In the third embodiment of the present invention, the pressure molding for making the polymeric film into a dome or cone is carried out in the state that the film can be stretched in the course of imidization before the imidization is completed. Hence it is also possible to readily obtain an acoustic diaphragm in a suitable form such as a dome or a cone. Since, in this embodiment also, the polymeric film is comprised of the readily graphitizable material such as the aromatic polyimide, polyoxadiazole or aromatic polyamide, it is possible to obtain a diaphragm made of an excellent graphite.

EXAMPLES

The present invention will be described below in greater detail by giving Examples. Of course, the present invention is by no means limited to these Examples.

Examples 1 to 4

A polyimide film (trade name: KAPTON; available from Toray-Du Pont Inc.) with a thickness of 25 μm (Example 1), 50 μm (Example 2), 75 μm (Example 3) or 125 μm (Example 4) was inserted to a molding jig made of carbon, having a dome of 30 mm in diameter and 25 mm in radius. Using a hot press furnace (G15X15HT-B-GP-HP15, manufactured by Chugai Rokogyo K. K. .), temperature was raised to 2,800° C. at a rate of temperature rise of 20° C./min in an argon atmosphere, and in that state a pressure of 10 kg/cm² was applied to the polyimide film. This simultaneous heating-pressure application was maintained for 2 hours to give the respective dome-like acoustic diaphragms.

Example 5

Example 1 was repeated to give a dome-like acoustic diaphragm except that a polyamide film (trade name: MK film, available from Asahi Chemical Industry Co., Ltd.) with a thickness of 50 μm was used.

Example 6

Example 1 was repeated to give a dome-like acoustic diaphragm except that a polyoxadiazole film (available from Furukawa Electric Co., Ltd.) with a thickness of 50 μm was used.

Example 7

Using an ultra-high temperature furnace (Type 45-6, manufactured by Shinsei Denro Seisakusho K. K.), a polyamide film (trade mame: MK film, available from Asahi Chemical Industry Co., Ltd.) with a thickness of 50 μm was heated at 2,800° C. in an argon atmosphere to give a graphite film. This film was then pressure-molded in the same procedure and under the same conditions as in Example 1 to give a dome-like acoustic diaphragm.

Example 8

A polyoxadiazole film (available from Furukawa Electric Co., Ltd.) with a thickness of 50 μm was secured to a frame made of graphite. Using a hot press furnace (G15X15HT-B-GP-HP15, manufactured by Chugai Rokogyo K. K. .), temperature was raised to 2,800° C. at a rate of temperature rise of 20° C./min in an argon atmosphere, and in that state a pressure of 10 kg/cm² was applied to the polyoxazole film with use of a molding jig made of carbon, having a dome of 30 mm in diameter and 25 mm in radius. This simultaneous heating-pressure application was maintained for 2 hours to give a dome-like acoustic diaphragms.

Physical properties (sound velocity and internal loss) of the acoustic diaphragms obtained in Examples 1 to 8 were measured using Dynamic Modulus Tester (trade name; manufactured by H.M. Morgan Co., Inc. A voice coil was also fitted to measure sound reproduction limit frequencies. Results of measurement are shown in Table 1.

In the meantime, the acoustic diaphragms of Examples 1 to 4 were partially cut out and their surfaces were examined using a scanning electron microscope (T-300 Type, manufactured by Nihon Denshi K.K.) to confirm that layer structures inherent in graphite were observed.

TABLE 1

| Examples | Sound velocity (km/sec) | Internal loss × 10⁻² | Limit frequencies (kHz) |
|---|---|---|---|
| 1 | 18.1 | 2.0 | 50.7 |
| 2 | 17.5 | 1.3 | 45.0 |
| 3 | 17.3 | 1.6 | 47.0 |
| 4 | 16.6 | 1.7 | 43.0 |
| 5 | 16.4 | 1.3 | 39.0 |
| 6 | 14.4 | 1.3 | 40.2 |
| 7 | 13.7 | 1.5 | 38.7 |
| 8 | 16.8 | 2.5 | 55.7 |

As will be seen from Table 1, the acoustic diaphragms of Examples 1 to 8 have superior sound characteristics that have not been hitherto achieved.

EXAMPLES 9 to 11

A polyamic acid solution (trade name: TORENYS, available from Toray Industries, Ltd.) was casted by knife coating onto a glass substrate to give a coating thickness of 250 μm, followed by heating to 120° C. to evaporate part of a solvent (a mixed solvent of N-methylpyrrolidone, dimethylacetamide and toluene) to give a polyamic acid film. The film formed was peeled from the glass substrate and set on a stretcher (a polymer stretcher manufactured by Sibayama Kagaku Kikai Seisakusho K.K.) and maintained at 220° C. for 10 minutes to carry on imidization, during which the film was pressure-molded at a pressure of 10 kg/m² using a dome-like stainless-steel mold with a dome of 30 mm in diameter and 15 mm in radius (Example 9), a dome-like stainless-steel mold with a dome of 30 mm in diameter and 25 mm in radius (Example 10) or a dome-like stainless-steel mold with a dome of 30 mm in diameter and 40 mm in radius (Example 11). Thereafter, the temperature was raised to 350° C. and heating was carried out for 10 minutes to complete the imidization. Dome-like molded aromatic polyimide films were thus obtained.

Subsequently, the resulting dome-like molded aromatic polyimide films were heated using a hot press furnace (G15X15HT-B-GP-HP15, manufactured by Chugai Rokogyo K.K..). Temperature was raised to 2,800° C. at a rate of temperature rise of 20° C./min in an argon atmosphere, and at that temperature a pressure of 50 kg/cm² was applied to the polyimide films using a dome-like shape-retaining mold made of carbon with a dome of 30 mm in diameter and 15 mm in radius (Example 9), a dome-like shape-retaining mold made of carbon with a dome of 30 mm in diameter and 25 mm in radius (Example 10) and a dome-like shape-retaining mold made of carbon with a dome of 30 mm in diameter and 40 mm in radius (Example 11), respectively. This heating was maintained for 2 hours to graphitize the molded polyimide film. Dome-like acoustic diaphragms were thus obtained.

EXAMPLE 12

A polyamic acid solution (trade name: TORENYS, available from Toray Industries, Ltd.) was casted by knife coating onto a glass substrate to give a coating thickness of 250 μm, followed by heating to 120° C. to evaporate part of a solvent (a mixed solvent of N-methylpyrrolidone, dimethylacetamide and toluene) to give a polyamic acid film. The film formed was peeled from the glass substrate and set on a stretcher (a polymer stretcher manufactured by Sibayama Kagaku Kikai Seisakusho K.K.). At the time when the temperature reached 120° C., the film was biaxially stretched by 10% and upward-downward pressure-molded at a pressure of 10 kg/m² using a dome-like stainless-steel mold with a dome of 30 mm in diameter and 100 mm in radius. Thereafter, the temperature was raised to 350° C. and heating was carried out for 10 minutes to complete imidization. A dome-like molded aromatic polyimide film was thus obtained.

Subsequently, the resulting dome-like molded aromatic polyimide film was heated using a hot press furnace (G15X15HT-B-GP-HP15, manufactured by Chugai Rokogyo K.K..). Temperature was raised to 2,800° C. at a rate of temperature rise of 20° C./min in an argon atmosphere, and at that temperature a pressure of 50 kg/cm² was applied to the polyimide film using a dome-like shape-retaining mold made of carbon with a dome of 30 mm in diameter and 100 mm in radius. This heating was maintained for 2 hours to graphitize the molded polyimide film. A dome-like acoustic diaphragm was thus obtained.

Physical properties (sound velocity and internal loss) of the acoustic diaphragms obtained in Examples 1 to 8 were measured using Dynamic Modulus Tester (trade name; manufactured by H.M. Morgan Co., Inc. A voice coil was also fitted to measure sound reproduction limit frequencies. Results of measurement are shown in Table 2.

In the meantime, the acoustic diaphragms of Examples 1 to 4 were partially cut out and their surfaces were examined using a scanning electron microscope (T-300 Type, manufactured by Nihon Denshi K.K.) to confirm that layer structures inherent in graphite were observed.

TABLE 2

| Examples | Sound velocity (km/sec) | Internal loss × 10⁻² | Limit frequencies (kHz) |
|---|---|---|---|
| 9 | 15.5 | 2.4 | 50.7 |
| 10 | 12.7 | 1.5 | 45.0 |
| 11 | 11.5 | 1.1 | 33.1 |
| 12 | 10.4 | 1.3 | 35.0 |

As will be seen from Table 2, the acoustic diaphragms of Examples 9 to 12 have superior sound characteristics.

What is claimed is:

1. A method of manufacturing an acoustic diaphragm comprises heating a polymeric film to effect graphitization of said polymeric film and at the same time pressure-molding said film into the shape of a dome or cone while heating said film to a temperature of from 2,000° C. to 3,000° C.;

said polymeric film comprising an aromatic polyimide, a polyoxadizole or an aromatic polyamide.

2. A method of manufacturing an acoustic diaphragm according to claim 1, wherein said pressure molding is carried out under application of a tension.

3. A method of manufacturing an acoustic diaphragm according to claim 1, wherein said pressure molding is carried out at a pressure of from 0.2 kg/cm² to 200 kg/cm².

4. A method of manufacturing an acoustic diagram according to claim 1, wherein said graphitization of said polymeric film is effected by heating said polymeric film to a temperature of from 2,000° C. to 3,000° C.

5. A method of manufacturing an acoustic diaphragm according to claim 4, wherein said pressure molding is carried out under application of a tension.

6. A method of manufacturing an acoustic diaphragm according to claim 4, wherein said pressure molding is carried out at a pressure of from 0.2 kg/cm$^2$ to 200 kg/cm$^2$.

7. A method of manufacturing an acoustic diaphragm which comprises pressure-molding an aromatic polyimide film formed in the course of heat polycondensation of a polyamic acid, and then heating the molded aromatic polyimide film at a temperature of 2,000° C. to 3,000° C. to effect its graphitization.

8. A method of manufacturing an acoustic diaphragm according to claim 7, wherein said aromatic polymide film is pressure-molded into a dome or a cone.

9. A method of manufacturing an acoustic diaphragm according to claim 7, wherein said pressure molding is carried out under application of a tension.

10. A method of manufacturing an acoustic diaphragm according to claim 7, wherein said pressure molding is carried out at a temperature of from 70° C. to 400° C.

11. A method of manufacturing an acoustic diaphragm according to claim 7, wherein said pressure molding is carried out at a pressure of from 0.5 kg/cm$^2$ to 2,000 kg/cm$^2$.

12. A method of manufacturing an acoustic diaphragm according to claim 7, wherein said heating is carried out under application of a pressure of from 0.1 kg/cm$^2$ to 200 kg/cm$^2$.

* * * * *